United States Patent [19]

Waechter et al.

[11] Patent Number: 4,943,963

[45] Date of Patent: Jul. 24, 1990

[54] DATA COLLECTION AND TRANSMISSION SYSTEM WITH REAL TIME CLOCK

[75] Inventors: Jerome R. Waechter, Clearwater; James T. Patten, St. Petersburg; Paul C. Kempter, Palm Harbor, all of Fla.

[73] Assignee: A. C. Nielsen Company, Northbrook, Ill.

[21] Appl. No.: 145,259

[22] Filed: Jan. 19, 1988

[51] Int. Cl.$^5$ .............................................. H04H 9/00
[52] U.S. Cl. ..................................... 370/94.1; 358/84; 455/2
[58] Field of Search ...................... 358/84; 455/2.5, 56; 340/870.02, 870.03, 825.07; 370/85, 85.1, 94.1

[56] References Cited

U.S. PATENT DOCUMENTS

| | | | |
|---|---|---|---|
| 3,651,471 | 3/1972 | Haselwood et al. | 358/84 |
| 3,772,649 | 11/1973 | Haselwood et al. | 358/84 |
| 3,899,175 | 8/1975 | Larsen | 364/900 |
| 4,025,851 | 5/1977 | Haselwood et al. | 358/84 |
| 4,044,376 | 8/1977 | Porter | 358/84 |
| 4,058,829 | 11/1977 | Thompson | 358/84 |
| 4,361,851 | 11/1982 | Asip et al. | 358/84 |
| 4,546,382 | 10/1985 | McKenna et al. | 358/84 |
| 4,583,090 | 4/1986 | Eden et al. | 340/825.07 |
| 4,642,685 | 2/1987 | Roberts et al. | 358/84 |
| 4,658,290 | 4/1987 | McKenna et al. | 358/84 |
| 4,677,466 | 6/1987 | Lert, Jr. et al. | 358/84 |
| 4,697,209 | 9/1987 | Kiewit et al. | 455/2 |
| 4,833,618 | 5/1989 | Verma et al. | 340/870.02 |

Primary Examiner—Douglas W. Olms
Assistant Examiner—Alpus H. Hsu
Attorney, Agent, or Firm—Mason, Kolehmainen, Rathburn & Wyss

[57] ABSTRACT

A communication method and a data collection and transmission system are provided having at least one remotely located monitoring station. A central computer is arranged for bidirectional communication with each of the monitoring stations. Each of the monitoring stations includes a storage and forward unit for communicating with the central computer and at least one sensor unit for monitoring a predetermined geographically proximate variable and for processing and storing predetermined operational data. The storage and forward unit includes a real time clock that is arranged to accurately maintain a real time indicative signal. A local area network connects the storage and forward unit and each of the sensor units. A coded message having a predetermined sequential data format is used for bidirectional communications between the storage and forward unit and the sensor units. A real-time coded message is provided by the storage and forward unit to the sensor units. The storage and forward unit includes a counter for counting at a predefined rate for identifying a delay time period prior to the transmission of the real-time coded message. Each sensor unit includes a counter for counting at the predefined rate to identify a second time delay period responsive to a received real-time coded message from the storage and forward unit. The real-time coded message includes the first identified time delay period that is combined with the second identified time delay period to determine the current time value by the sensor unit.

42 Claims, 2 Drawing Sheets

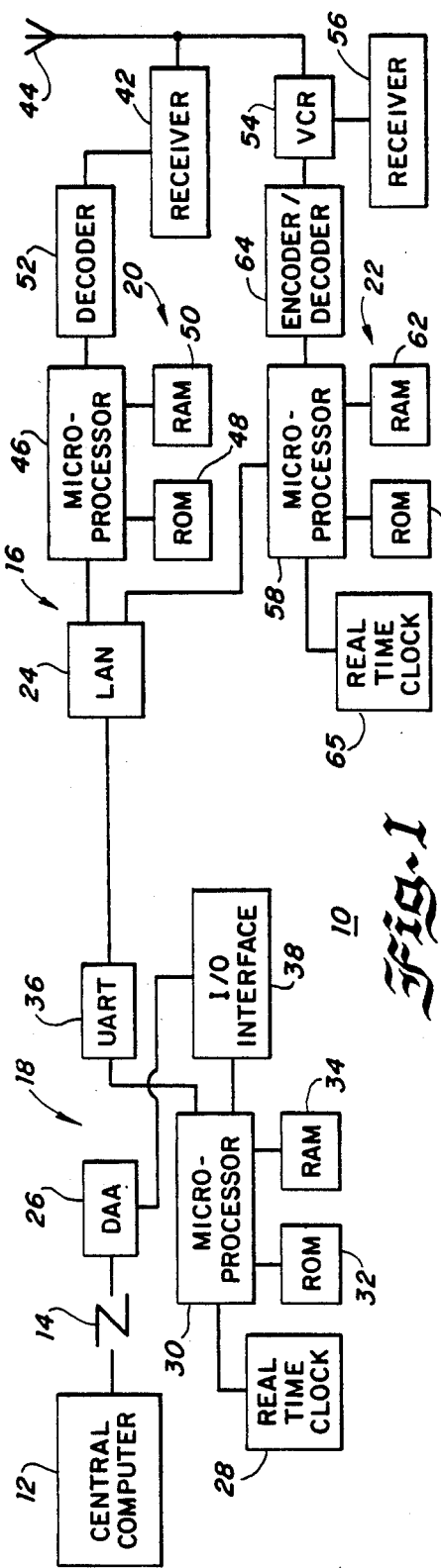
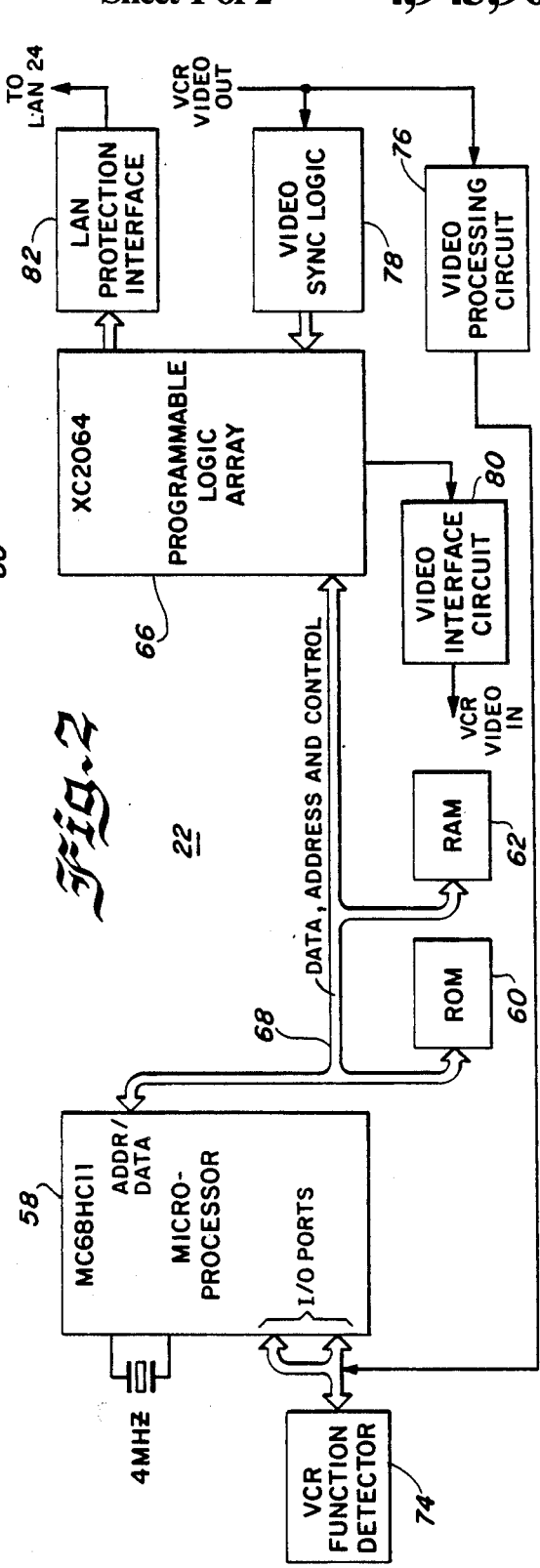
Fig. 1
Fig. 2

DATA COLLECTION AND TRANSMISSION SYSTEM WITH REAL TIME CLOCK

BACKGROUND OF THE INVENTION

A. Field of the Invention

This invention relates general to data collection and transmission systems, and more particularly to real time clock functions and timing methods for use with television audience measurement and broadcast program identification data collection systems.

B. Description of the Prior Art

An accurate time reference is often useful in various different data collection and monitoring systems. U.S. Pat. No. 3,651,471 issued to Haselwood et al., on Mar. 21, 1972 and related U.S. Pat. No. 3,742,463 issued to Haselwood et al., on Jun. 26, 1973 disclose a data storage and transmission system for monitoring via telephone a large number of remotely located television receivers or the like that utilizes an elapsed time counter for maintaining an elapsed time record stored as part of the recorded data changes.

U.S. Pat. No. 4,025,851, issued to Haselwood et al., on May. 24, 1977 discloses a system for automatically monitoring the programs broadcast by commercial television stations with a monitoring station having a clock for generating an elapsed time indicative signal and a central computer for providing a real time reference signal and for calculating the actual time of occurrence of a particular detected program change. The disclosed system, while effective for its intended purpose, requires considerable processing by the central computer to determine the real time reference data.

U.S. Pat. No. 4,677,466 issued to Lert, Jr. et al., on Jun. 30, 1987 discloses a broadcast program identification system with a station monitoring unit having a real time clock or a relative time clock that is periodically reset from an accurate clock, for example, a timing signal transmitted by the National Bureau of Standards.

SUMMARY OF THE INVENTION

Accordingly, it is an important object of the present invention to provide an improved data collection and monitoring system that can be effectively and efficiently configured for monitoring various predetermined operational variables. Other principle objects of the present invention are to provide such improved data collection and monitoring system wherein the required data processing by central computer is minimized; to provide such system having at least one distributed processor monitoring station; to provide such system utilizing a distributed processor monitoring station having a storage and forward unit and a plurality of geographically proximate sensor units for monitoring various operational data variables; to provide such system with each of the sensor units having a microprocessor for processing its particular monitored operational data and for communicating with the storage and forward unit; to provide and arrangement such that each of the sensor units accurately and efficiently determines a current time value for storage with its particular monitored operational data; and to provide a communications method and protocol effective for accurately determining a current time value for use with each of a plurality of geographically proximate sensor units within a monitoring station.

In brief, these and other objects and advantages of the invention ar provided by a communication method and a data collection and transmission system having at least one remotely located monitoring station. A central computer is arranged for bidirectional communication with each of the monitoring stations. Each of the monitoring stations includes a storage and forward unit for communicating with the central computer and at least one sensor unit for monitoring a predetermined geographically proximate variable and for processing and storing predetermined operational data. The storage and forward unit includes a real time clock that is arranged to accurately maintain a real time indicative signal. A local area network connects the storage and forward unit and each of the sensor units. A coded message having a predetermined sequential data format is used for bidirectional communications between the storage and forward unit and the sensor units. A current time coded message is provided by the storage and forward unit to the sensor units. The storage and forward unit includes a counter for counting at a predefined rate for identifying a delay time period prior to the transmission of the real time coded message. Each sensor unit includes a counter for counting at the predefined rate to identify a second time delay period responsive to a received real time coded message from the storage and forward unit. The real time coded message includes the first identified time delay period that is combined with the second identified time delay period to determine the current time value by the sensor unit.

DESCRIPTION OF THE DRAWING

These and other objects and advantages of the present invention will become readily apparent upon consideration of the following detailed description and attached drawing, wherein:

FIG. 1 is a block diagram of a data collection and transmission system according to the present invention;

FIG. 2 is a partly schematic block diagram representation of an exemplary sensor unit of the system of FIG. 1, and FIGS. 3A-3D are flow charts illustrating the logical timing algorithm steps performed by the monitoring station of FIG. 1.

DETAILED DESCRIPTION OF THE PREFERRED EMBODIMENT

Figure 3A:
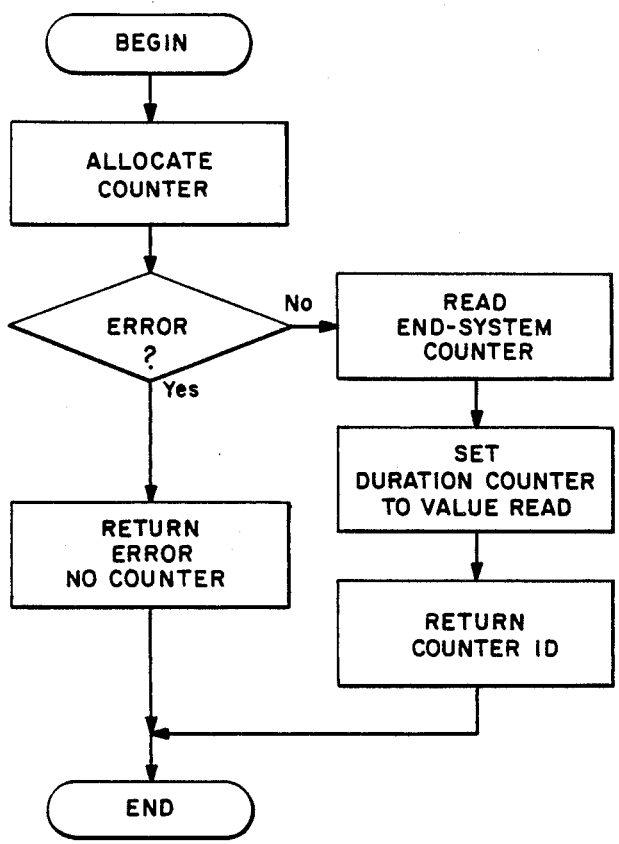

Referring now to the drawing, with particular attention to FIG. 1, there is illustrated a block diagram of a data collection and transmission system according to the invention designated generally by the reference character 10. The data collection and transmission system 10 is particularly useful for identifying broadcast programs and television audience viewing habits. The data collection and transmission system 10 includes a central computer 12 arranged for bidirectional communications with each of a plurality of remotely located monitoring stations via a suitable commnications link 14, such as a telephone line. FIG. 1 illustrates a single monitoring station of the invention designated in its entirety by the reference character 16.

The monitoring station 16 includes a storage and forward unit 18 for communicating with the central computer 12, a plurality of geographically proximate sensor units such as the illustrated sensor units 20 and 22 for monitoring predetermined variables and storing operational data, and a local area network 24 for interconnecting the storage and forward unit 18 and the sensor units 20 and 22. Various known arrangements can be utilized for the local area network (LAN) 24, for example, such as existing local power wiring or a dedicated wire within a monitored household.

A distributed processor arrangement is utilized for the monitoring station 16 with each of the storage and forward unit (SFU) 18 and the sensor units 20 and 22 including a processor device, such as a microprocessor. A common communications protocol is used for each of the SFU 18 and the sensor units 20 and 22 so that any one unit can be modified or changed without affecting or requiring any change in the other units within the monitoring station 18. Each of the sensor unit 20 and 22 and the SFU 18 has a unique identification code to distinguish each unit on the LAN 24. SFU 18 can initiate communications to request or transfer data to the sensor units 20 and 22. Each of the sensor unit 20 and 22 can initiate communications with the SFU 18 or the other sensor unit 20 or 22. SFU 18 receives and stores data from each of the sensor units 20 and 22 for subsequent transmission to the central computer 12.

Data collected by the monitoring station 16 is transferred to the central computer 12 at periodic intervals, such as once per day. A data access arrangement (DAA) 26 contained within the SFU 18, having functions, such as a both automatic answering and dialing modem for data communications, enables data communications between the monitoring station 16 and the central computer 12. Data transfer can be initiated by the SFU 18 or the central computer 12. A real time clock 28 contained within the SFU 18 can be resynchronized or updated during the data collection connection with the central computer 12. The real time clock 28 can be implemented by a commercially available integrated circuit device, such as the MM58274 manufactured and sold by National Semiconductor Corporation.

During a data collection connection, the monitoring station 16 can also be reprogrammed by the central computer 12. For example, the SFU 18 can receive a program to change its scheduled time for calling the central computer 12. Additionally, the central computer 12 can transfer a program or programs to the SFU 18 to alter the monitoring functions of the sensor units 20 and/or 22.

As its other basic components, the SFU 18 includes a microprocessor 30 for executing a software program and associated memory devices including a read only memory (ROM) 32 for program storage, and a random access memory (RAM) 34 for data and program storage. A universal asynchronous receiver transmitter (UART) 36, such as an integrated circuit device NSC858 sold by National Semiconductor Corporation is used in the SFU 18 for connection with the LAM 24. A National NSC800 microprocessor can be used for the microprocessor 30 together with a National NSC810 peripheral input/output (I/O) integrated circuit device 38 for interfacing with peripheral devices, such as the DAA 26.

The sensor unit 20 is arranged for monitoring a television receiver 42 that receives television broadcast signals from a receiving antenna 44. Sensor unit 20 includes a processor device such as a microprocessor 46 and an associated ROM 48 for program storage and a RAM 50 for program and data storage. A decoder circuit 52 is used for monitoring desired variables and operational functions of the receiver 42, such as the channel reception of the monitored received and the number of people in the viewing audience. Decoded signals from the decoder circuit 52 are received by the microprocessor 46 for subsequent combining with a real time reference of the time of occurence. The real time reference data is obtained from the real time clock 28 within the SFU 18. The communications between the sensor unit 20 and the SFU for obtaining the real time reference data is described with respect to FIGS. 3A–3D. The combined time data signals received from the decoder 52 are stored in the RAM 50 and subsequently transferred to the SFU 18.

A video cassette recorder (VCR) 54 that is used in conjunction with a second television receiver 56 is monitored by the sensor unit 22. Broadcast signals from the receiving antenna 44 are applied to the VCR 54. Sensor unit 22 is arranged similarly to sensor unit 20 and includes a microprocessor 58, a ROM 60, a RAM 62 and a decoder device 64. A real time clock 65 within the sensor unit 22 maintians a current time reference signal. The real time clock 65 can be implemented by the same type integrated circuit device as used for the real time clock 28 in the SFU 18 or within the microprocessor 58, as described with respect to FIG. 2. Sensor unit 22 periodically resynchronizes its real time clock with the real time clock 28 in the SFU 18.

Referring now to FIG. 2, there is shown a more detailed partly schematic and block diagram representation of the sensor unit 22. An eight-bit microprocessor device such as a Motorola HCMOS MC68HC11 device can be used for the microprocessor 58; however, various commercially available microprocessors having standard capabilities can be used for the microprocessor 58. The MC68HC11 microprocessor 58 includes a programmable timer system having a 16-bit free-running timer counter register, a real time interrupt circuit, a pulse accumulator and control register that advantageously can be used for the timing and counting functions of the sensor unit 22. On-chip peripheral functions including a serial communications interface (SCI) subsystem used for communications over the LAN 24, and a serial peripheral interface (SPI) subsystem used, for example, for controlling an associated tuner or channel selector, are provided by MC68HC11 microprocessor 58. The input/outputs (I/O's) os SCI and SPI subsystems are Port D I/O's of the microprocessor. Port E of the MC68HC11 microprocessor 58 provides and 8-channel analog-to-digital (A/D) converter peripheral function. This microprocessor 58 further includes 8 K bytes of ROM, 256 bytes of RAM and 512 bytes of electrically erasable programmable read only memory (EEPROM).

A programmable logic arrary (PLA) 66, such as a XILINX integrated circuit device type XC2064, used in conjuction with the microprocessor 58, provides decoder logic functions. A microcomputer bus 68 for data, address and control signals enables communications between the microprocessors 58 and the PLA 66. Address/data input/outputs (I/O's) of the microprocessor 58 are applied to the PLA 66, the ROM 60 and the RAM 62 via the bus 68.

Signal lines indicative of monitored finctional parameters provided by a VCR function detector circuit 74, such as tuning voltage, play, record, are connected to selected port I/O's of the microprocessor 58 and selected inputs of the PLA 66 via the bus 68. A VCR video output signal is applied to the a video processing circuit 76. The video output signal is obtained for example, by direct connection to the video output signal jack of the VCR 54. The VCR video signal can be used to identify repetitively broadcast programs, such as commercial advertisements, such as is disclosed in U.S. Pat. No. 4,677,466 to Lert, Jr., et al., issued Jun. 30, 1987.

A video synchronizing detection logic circuit 78 receives the VCR video output signal and is connected to the PLA 66 providing vertical and horizontal synchronizing signals. A video interface circuit 80 converts digital combined time encoded signals from the PLA 66 to a compatible analog signal for combining with a video input signal to the VRC 54. Thus, coded information from the PLA 66 that included real time reference is applied to the monitored VCR 54 for storage on a video tape with the video signal being recorded.

Communications across the LAN 24 are provided by predefined outputs of the PLA 66 coupled via a LAN protection and interface circuit 82 to the LAN 24. The LAN protection and interface circuit 82 translates the serial I/O data from the SCI subsystem of the microprocessor 58 to the particular signal utilized for LAN 24.

In accordance with LAN communications protocol and timing method of the invention, a variable length coded data message for transmission over the LAN 24 has a predefined sequential format. The sequential format of the transmitted coded data message consists of a start of message, a message header, a message header checksum, a data packet and a data packet checksum. The start of message data includes at least two bytes of data that are identified by a receiving unit for starting a duration counter. The message header includes for example four bytes of data. A first destination address byte of the message header provides the identification code of the particular receiving unit 18, 20 or 22. A second source address byte of the message header provides the identification code of the unit transmitting the coded data message. A third message length data byte of the message header defines the number of bytes contained within the data packet. A last byte of message header provides a counter value used to identify the message transmission time over the LAN 24.

The message header checksum includes a checksum data byte for error checking. Any of a variety of conventional methods is employed for detecting errors utilizing a data checksum value.

The data packet contains a variable number of bytes to accommodata the particular information and the number of bits allocated to each item of information to be transmitted. The particular number of data bytes corresponds to the defined message length data byte within the message header. the data packet checksum includes a checksum data byte for error checking of the received data.

Transmission of a large data file, such as for program substitution within a sensor unit 20 or 22 or for collecting stored data from the sensor units, is provided by a series of coded messages. An identified number of data bytes of the data file are transmitted with each of the sequential messages. This number of data bytes is made as large as is practical to minimize the total time for the file transfer while avoiding transmission errors.

Both the SFU 18 and the sensor units 20 and 22 use this predefined coded data message format for all communications over the LAN 24. In a data transmission from the SFU 18 to the sensor unit 22 to update the real time clock 65, the data packet contains the current time data. For example, the data packet may contain two data bytes for identifying the current time including sequential bits for identifying the month, day, hour, a.m. or p. m., minutes and seconds.

In order to both update the real time clock 65 in the sensor unit 22 and accurately provide current time data to the sensor unit 20, the transmission delay time of a coded data message over the LAN 24 must be determined. The communications timing method of the invention identifieds the transmission time or message delay time independently of the transmission rate of the LAN 24. The time for transmitting a coded data message over the LAN 24 is determined as follows.

A first duration counter within the transmitting unit 18, 20 or 22 is established when the data to be transmitted is created. The first duration counter is incremented at a predefined rate and maintained until the start of message is transmitted. The first duration counter is read and transmitted at the last byte of the message header. The particular receiving unit 18, 20 or 22 establishes a second duration counter when the start of message is received. The second duration counter is incremented at the same predefined rate as the first duration counter and maintained until the data packet checksum is received. The second duration counter is read and added to the received first duration counter value. The resulting combined value corresponds to the transmission time delay or age of the data packet since its creation. The current time data packet is adjusted to include the thus identified transmission time dalay period to accurately provided a current time reference value.

In the sensor unit 22, the real time clock 65 is then updated with the current time reference value. The SFU 18 can transmit a current time coded message at scheduled intervals, for example, after the SFU 18 receives current time data from the central computer 12. Also the sensor unit 22 can request the current time from the SFU 18 at scheduled intervals, for example once a day, for periodically updating its real time clock 65.

Other sensor units that do not have a real time clock, such as sensor unit 20, utilize the current time reference value to determine the actual time of occurrence of operational data. A duration counter is established with each occurrence of a change in a monitored parameter variable, such as a change in the tuned channel of the monitored receiver, and is stored with the change data. Subsequently when a current time reference value is determined as before described, the actual time of occurrence of the stored change data is calculated by determining the elapsed time. The elapsed time is subtracted from the current time reference value to provide the actual time of occurrence for each stored monitored data.

Referring to FIG. 3A, there is illustrated the logical steps peformed by the microprocessor 30, 46 or 58 within the particular transmitting or receiving unit for establishing a duration counter, such as the first and second duration counters. First a register within the microprocessor, for example the microprocessor 30, is allocated for use as the duration counter. An error check is then performed to identify the integrity of the data to be transmitted. When an error is not detected, a global counter or end-system counter value is read. The end-system counter is a free-running counter that is incremented, for example by a hardware timer interrupt service routine, at the predefined rate of ten Hertz. Ten Hertz provides approximately an order of magnitude resolution greater than the expected resolution time requirement for viewing data; i.e. one-tenth second as compared to one second for monitored viewing data. A thirty-two bit or four byte counter is used for the end-system counter that is set to zero at system restart initialization to provide a global counter lifetime of about 13.6 years before counter roll-over.

Then the end-system counter value is stored in the allocated register and the duration counter address is returned. Otherwise, when an error is detected, the identified error is returned without establishing the duration counter.

Figure 3C:
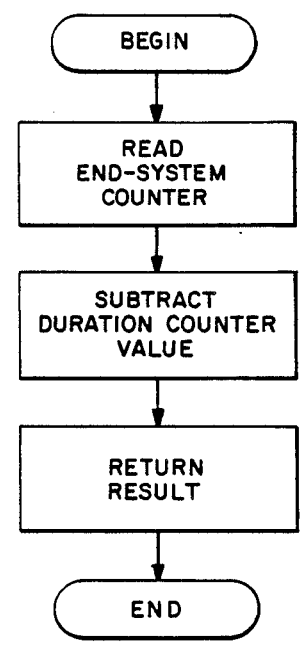
Figure 3B:
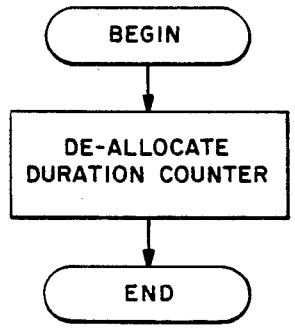

FIG. 3B illustrates the logical steps performed to end a duration counter, freeing its use for other applications. The allocated register within the microprocessor is deallocated and the deallocated register address is returned as available or free memory.

FIG. 3C illustrates the logical steps performed to read a duration counter. First the end-system counter is read. Then the duration counter value is substracted from the read end-system counter value to provide a thirty-two bit value. The thus calculated count value is returned as the duration count value.

Figure 3D:
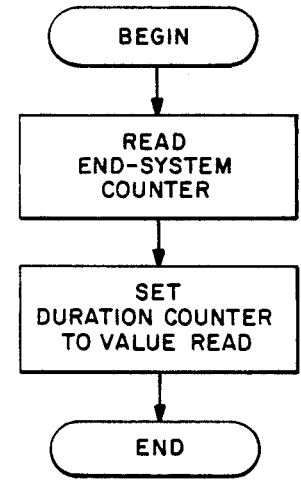

FIG. 3D illustrates the logical steps performed to reset the duration counter. First the end-system counter is read. Then the allocated duration counter location is set to the read end-system counter value. The reset duration counter register address is returned.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. A data collection and transmission system comprising:
   at least one remotely located monitoring station for collecting and storing predetermined operational data;
   a central computer arranged for bidirectional communication with said monitoring station and for processing said stored predetermined operational data;
   said at least one remotely located monitoring station including a storage and forward unit for communicating with said central computer and having a real time clock, at least one sensor unit for monitoring and storing predetermined operational data and a local area network connecting said storage and forward unit and each of said sensor units; and
   said at least one sensor unit including means for receiving a real time coded message from said storage and forward unit, and means responsive to said received real time coded message for determining a current time value, said current time value determining means including means for identifying a transmission time delay over said local area network, and means responsive to said identified transmission time delay for adjusting said real time coded message.

2. A data collection and transmission system as recited in claim 1 wherein said storage and forward unit and each of said at least one sensor unit includes processor means for bidirectional communications therebetween and including means for generating predefined requests.

3. A data collection and transmission system as recited in claim 2 wherein said predefined requests generated by said at least one sensor unit include a current time request.

4. A data collection and transmission system as recited in claim 1 wherein said storage and forward unit and each of said at least one sensor unit includes means for generating a unique identification code.

5. A data collection and transmission system as recited in claim 1 wherein said means responsive to said received real time coded message for determining a current time value include means for identifying a first count value within said coded message; means for identifying a second count value responsive to said received real time coded message; and means for combining said first and second identified count values to identify a time delay value.

6. A data collection and transmission system as recited in claim 5 further including means responsive to said identified time delay value for incrementing said received real time coded message to determine the current time value.

7. A data collection and transmission system as recited in claim 1 wherein a coded message having a predetermined sequential data format is used for bidirectional communications between said storage and forward unit and said at least one sensor unit.

8. A data collection and transmission system as recited in claim 7 wherein said coded message has a variable length, said variable length determined by a coded data packet.

9. A data collection and transmission system as recited in claim 7 wherein said coded message begins with at least one start of message byte and ends with a data packet checksum byte.

10. A data collection and transmission system as recited in claim 9 wherein said storage and forward unit includes a first duration counter initialized responsive to a real time data packet being created and read responsive to said start of message byte being transmitted.

11. A data collection and transmission system as recited in claim 10 wherein each of said at least one sensor unit includes a second duration counter initialized responsive to said start of message byte being received and read responsive to a data packet checksum byte being received.

12. A data collection and transmission system as recited in claim 10 wherein said first and second duration counters are incremented at a predefined rate.

13. A data collection and transmission system as recited in claim 12 wherein said predefined rate equals approximately ten Hertz.

14. A data collection and transmission system as recited in claim 1 wherein each of said at least one sensor unit includes means for identifying an actual time of occurrence of said stored predetermined operational data responsive to said determined current time value.

15. A data collection and transmission system as recited in claim 1 wherein a predetermined one of said at least one sensor unit includes a real time clock and means for updating said real time clock responsive to said determined current time value.

16. A data collection and transmission system as recited in claim 1 wherein a predetermined one of said at least one sensor unit monitors predefined operational functions of a video cassette recorder and stores predetermined operational data, said predetermined one sensor unit includes a real time clock for providing a real time clock value and means for updating said real time clock responsive to said determined current time value.

17. A data collection and transmission system as recited in claim 16 wherein said real time clock value is stored with said stored video cassette recorder operational data.

18. A monitoring station for use in a data collection and transmission system of the type including a central computer arranged for transmitting data to and collecting data from a plurality of remotely located monitoring stations, said monitoring station comprising:
a storage and forward unit for communicating with the central computer and having a real time clock, at least one sensor unit for monitoring a predetermined geographically proximate variable, for processing and storing predetermined operational data and a local area network connecting said storage and forward unit and each of said sensor units; and
each of said at least one sensor unit including means for receiving a real time coded message from said storage and forward unit, and means responsive to said received real time coded message for determining a current time value, said current time value determining means including means for identifying a transmission time delay over said local area network, and means responsive to said identified transmission time delay for adjusting said real time coded message.

19. A monitoring station as recited in claim 18 wherein said storage and forward unit and each of said at least one sensor unit includes processor means for bidirectional communications therebetween and including means for generating predefined requests.

20. A monitoring station as recited in claim 19 wherein said predefined requests generated by said at least one sensor unit include a current time request.

21. A monitoring station as recited in claim 18 wherein said storage and forward unit and each said monitoring station includes means for generating a unique identification code.

22. A monitoring station as recited in claim 18 wherein said means responsive to said received real time coded message for determining a current time value include means for identifying a first count value within said coded message; means for identifying a second count value responsive to said received real time coded message; and means for combining said first and second identified count values to identify a time delay value.

23. A monitoring station as recited in claim 22 further including means responsive to said identified time delay value for incrementing said received real time coded message to determine the current time value.

24. A monitoring station as recited in claim 18 wherein a coded message having a predetermined sequential data format is used for bidirectional communications between said storage and forward unit and said at least one sensor unit.

25. A monitoring station as recited in claim 24 wherein said coded message has a variable length, said variable length determined by a coded data packet.

26. A monitoring station as recited in claim 24 wherein said coded message begins with at least one start of message byte and ends with a data packet checksum byte.

27. A monitoring station as recited in claim 26 wherein said storage and forward unit includes a first duration counter initialized responsive to a real time data packet being created and read responsive to said start of message byte being transmitted.

28. A monitoring station as recited in claim 27 wherein each of said at least one sensor unit includes a second duration counter initialized responsive to said start of message byte being received and read responsive to a data packet checksum byte being received.

29. A monitoring station as recited in claim 28 wherein said first and second duration counters are incremented at a predefined rate.

30. A monitoring station as recited in claim 29 wherein said predefined rate equals approximately ten Hertz.

31. A monitoring station as recited in claim 18 wherein each of said at least one sensor unit includes means for identifying an actual time of occurrence of said stored predetermined operational data responsive to said determined current time value.

32. A monitoring station as recited in claim 18 wherein at least one of said at least one sensor unit includes a real time clock and means for updating said real time clock responsive to said determined current time value.

33. A monitoring station as recited in claim 18 wherein a predetermined one of said at least one sensor unit monitors predefined operational functions of a video cassette recorder and stores predetermined operational data, said predetermined one sensor unit includes a real time clock for providing a real time clock value and means for updating said real time clock responsive to said determined current time value.

34. A monitoring station as recited in claim 18 wherein said real time clock value is stored with said stored video cassette recorder operational data.

35. A method for identifying a transmission time delay of a predefined coded message transmitted over a local area network comprising the steps of:
reading a real time clock to identify a current time data value;
initializing a first duration counter within a transmitting unit responsive to said identified current time data value;
transmitting a start of message byte of the predefined coded message;
reading said first duration counter responsive to said transmitted start of message byte;
transmitting said read first duration counter value in a predefined message header byte of the predefined coded message;
initializing a second duration counter within a receiving unit responsive to a received start of message byte;
reading said second duration counter responsive to a received data packet checksum byte of the predefined coded message;
identifying said first duration counter value of the predefined message header byte of the predefined coded message; and
combining said first and second duration counter values.

36. A method as recited in claim 35 wherein the step of initializing a first duration counter within a transmitting unit responsive to said identified current time data value includes the steps of:
allocating an addressable storage register for the first duration counter;
reading an end-system counter within the transmitting unit; and storing said read end-system counter value within said allocated storage register.

37. A method as recited in claim 36 wherein the step of reading said first duration counter responsive to said transmitted start of message byte includes the steps of:
reading said end-system counter; and
subtracting said stored allocated storage register value to identify the first duration counter value.

38. A method as recited in claim 36 further including the step of:
performing error checking of the current time data responsive to said allocated storage register; and
deallocating said allocated storage register responsive to an identified error.

39. A method as recited in claim 35 wherein said step of initializing a second duration counter within a receiving unit responsive to a received start of message byte includes the steps of:
allocating an addressable storage register for the first duration counter;
reading an end-system counter within the receiving unit; and
storing said read end-system counter value within said allocated storage register.

40. A method as recited in claim 39 wherein said step of reading said second duration counter responsive to a received data packet checksum byte of the predefined coded message includes the steps of:
reading said end-system counter; and
subtracting said stored allocated storage register value to identify the first duration counter value.

41. A method for providing a current time reference value to a plurality of geographically proximate sensor units utilizing a real time clock within a storage and forward unit and a local area network connecting the storage and forward unit and each of the sensor units, said method comprising the steps of:
transmitting a predefined real time coded message from the storage and forward unit over the local area network, said coded message having a predefined sequential coded format and including an identification data byte for one of the sensor units;
initializing a duration counter in said identified sensor unit responsive to receiving a start of message byte within said transmitted coded message;
reading said duration counter responsive to receiving a data packet checksum byte within said transmitted coded message;
identifying a delay count value within said transmitted coded message;
combining said read duration counter value with said identified delay count value to identify a transmission time delay; and
adjusting a real time data value within said transmitted coded message by said identified transmission time delay to determine the current time reference value.

42. A method as recited in claim 41 wherein said step of transmitting a predefined real time coded message from the storage and forward unit over the local area network includes the steps of:
reading a real time clock to identify a current time data value;
establishing a duration counter within the storage and forward unit responsive to said identified current time data value;
transmitting a start of message byte of the predefined coded message;
reading said duration counter responsive to said transmitted start of message byte to provide said delay count value within the predefined coded message.

* * * * *